United States Patent [19]

Vermeulen

[11] 3,984,143

[45] Oct. 5, 1976

[54] OPEN-ROOF CONSTRUCTION FOR A VEHICLE

[75] Inventor: Theodorus Hendricus Vermeulen, Haarlem, Netherlands

[73] Assignee: Vermeulen-Hollandia B.V., Haarlem, Netherlands

[22] Filed: July 28, 1975

[21] Appl. No.: 599,947

[30] Foreign Application Priority Data

July 29, 1974 Netherlands ........................ 7410150

[52] U.S. Cl. .............................................. 296/137 J

[51] Int. Cl.² .............................................. B60J 7/10

[58] Field of Search ......... 296/137 J, 137 G, 137 B; 267/60; 98/2.14

[56] References Cited

UNITED STATES PATENTS

| | | | |
|---|---|---|---|
| 3,156,175 | 11/1964 | Werner | 296/137 J |
| 3,711,150 | 1/1973 | Perks | 296/137 J |

*Primary Examiner*—Robert R. Song

*Attorney, Agent, or Firm*—Haseltine, Lake & Waters

[57] ABSTRACT

Open-roof construction for a vehicle, comprising a air-guiding strip which connects on both sides to a rearward, rigid bearing arm that is pivotally supported by the vehicle, while a spring member is provided underneath each bearing arm, the underside of which is pivotally connected to the vehicle, the upper side being pivotally connected to the bearing arm. The vertical upward force component of the spring members has substantially a maximum value in the operative position of the air-guiding strip, and a minimum value in the rest position of the same.

8 Claims, 3 Drawing Figures

OPEN-ROOF CONSTRUCTION FOR A VEHICLE

BACKGROUND OF THE INVENTION

The invention relates to an open-roof construction for a vehicle, comprising an air-guiding strip fitted on the front side of the roof opening and supported on both sides by spring members carried by the vehicle, the air-guiding strip and the spring members being accommodated underneath the sliding panel in the closed position of that panel, while the air-guiding strip is displaced upwards into the operative position by the spring members when the panel is being opened, and is moved downwards again into the rest position against the pressure of the spring members under the action of this panel when the panel is being closed.

In a prior-art embodiment of such an open-roof construction (Dutch Patent 79.778), a straight air-guiding strip is attached on both sides to a leaf spring. When the sliding panel is being closed, the panel engages with these leaf springs, the latter and the air-guiding strip being displaced downwards to the inoperative position in which these leaf springs and the air-guiding strip lie underneath the panel.

Although this known embodiment of the air-guiding strip has performed well in practice, there is the possibility, especially in the case of wider vehicles, that the air-guiding strip in its upper or operative position slightly moves down under the action of the wind force and starts vibrating, since the upwards component of the force applied by the leaf springs has its minimum value in this highest position of the air-guiding strip.

SUMMARY OF THE INVENTION

The present invention has the object to provide an open-roof construction in which the above drawback is effectively obviated.

To this end, this open-roof construction according to the invention is characterized in that the air-guiding strip connects on both sides to a rearward, rigid bearing arm which is pivotally supported by the vehicle and with which the panel engages when it is being closed, while underneath each bearing arm a spring member is provided the underside of which is pivotally connected to the vehicle, the upper side being pivotally connected to the bearing arm. The spring members pivot upwards and assume a more vertical position when the air-guiding strip is being displaced upwards into the operative position, and pivot downwards and assume a less vertical position when the air-guiding strip is being displaced downwards. As a result the vertical upward force component of the spring members substantially has a maximum value in the operative position of the air-guiding strip, and a minimum value in the rest position of the air-guiding strip.

While the air-guiding strip is being displaced upwards to its top position, the spring members will pivot upwards themselves, in the course of which motion the length of the springs is changed but the vertical upward force component is nevertheless increased. Contrary to the aforementioned known construction, where the upward force applied to the air-guiding strip has its minimum value in the operative position, this upward force has its maximum value in the operative position of the open-roof construction according to the invention. As a result, the air-guiding strip is always forcefully held in the operative position under the action of the spring members, even in the case of wider vehicles.

Nevertheless, the force to be applied by the sliding panel to the bearing arms during the closing operation is not excessive, and it even decreases while the spring members are being swung down.

The bearing arms of the air-guiding strip according to the invention come into contact with the sliding panel when the sliding panel is being closed, and serve for supporting as well as for shifting the air-guiding strip. These bearing arms furthermore have surprisingly been found to enhance the air conduction very substantially and, specifically, to counteract lateral air ingress through the roof opening into the vehicle. According to the invention, these bearing arms thus perform a multiple function.

According to a simple, compact embodiment of the open-roof construction of the invention, each spring member consists of a compression spring arranged around or in a telescopic pin-and-sleeve assembly and confined between spring supports, the lower part of the pin-and-sleeve assembly being hinged to the vehicle and the upper part of the pin-and-sleeve assembly being hinged to the bearing arm.

Each bearing arm can furthermore be supported by the vehicle with the use of a leaf spring, thus effectively preventing any rattling.

The invention furthermore comprises an air-guiding strip for an open-roof construction of a vehicle.

According to the invention, this air-guiding strip is characterized in that it is equipped on both sides with a rearward, rigid bearing arm that is connected through a bend to the front part of the strip.

BRIEF DESCRIPTION OF THE DRAWINGS

The invention will hereinafter be explained in further detail with reference to the drawing which illustrates an example of an open-roof construction and a suitable strip according to the invention for a vehicle.

DESCRIPTION OF A PREFERRED EMBODIMENT

Figure 1:
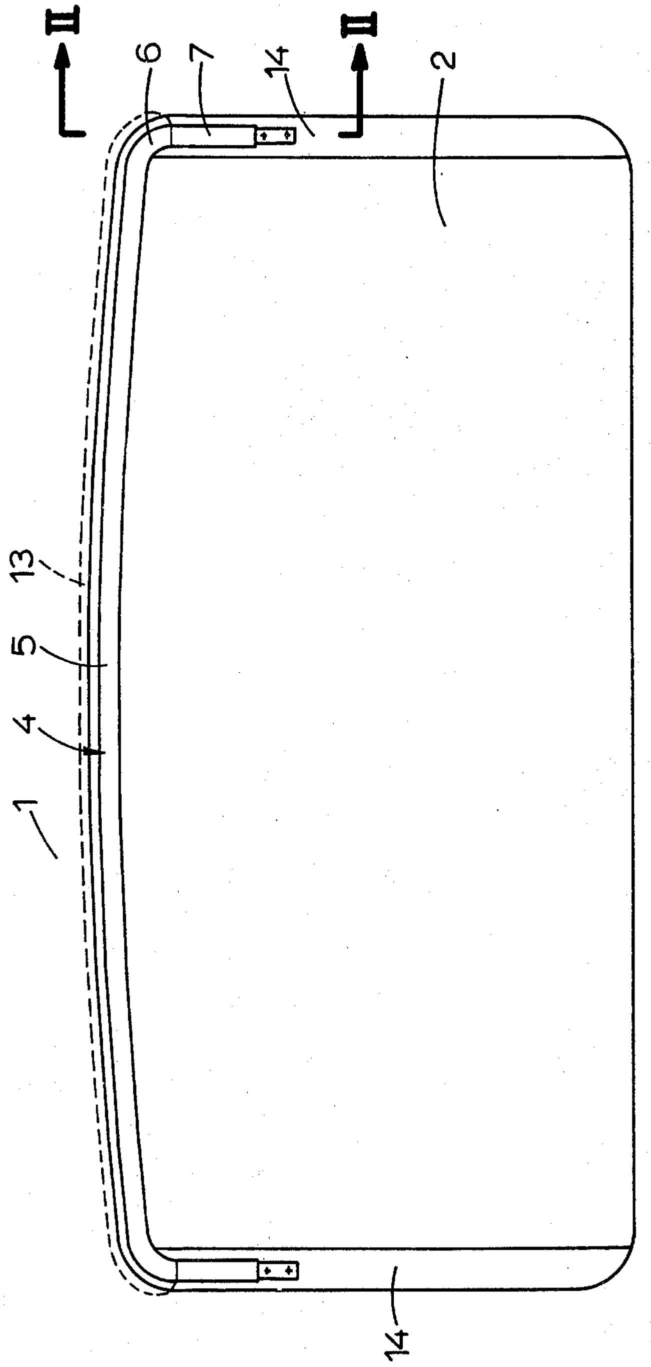
FIG. 1 is a schematic top view of the opening in a vehicle roof in the open position of the sliding panel, where an air-guiding strip according to the invention is visible.

The drawing illustrates an example of an open-roof construction according to the invention for a vehicle, specifically an automobile.

A fixed roof 1 of the vehicle comprises an opening 2 which can be closed by means of a sliding panel 3. An air-guiding strip 4 is fitted on the front side of the roof opening 2. This air-guiding strip 4 comprises a front part 5 which connects on both sides by way of a bend 6 to a rearward bearing arm 7.

The front part 5 of the strip as well as the bends 6 and the rearward bearing arms 7 are of a substantially rigid construction. To this end, the bearing arms 7 have the shape of an inverted U in vertical section, and an S-shaped stiffening strip 8 is spot-welded against the back surface of the front part 5 of the air-guiding strip. The S-shaped stiffening strip 8 possesses curved ends 9 which are fastened to the bends 6.

The front part 5 of the strip and the bends 6, together with the S-shaped stiffening strip 8, jointly enclose a chamber 10, in which the rear end 11 and a protrusion 12 of an elastic sealing section 13 are confined.

The bearing arms 7 are elastically hinged on their rear end to a gutter 14 of the vehicle on both sides of the roof opening 2. To this end, the gutter 14 is equipped on both sides with a horizontal bearing plate 15, on the rear end of which a leaf spring 16 is secured by means of bolts 17. The front part of this leaf spring 16 is fastened to the rear part of the relative bearing arm 7 and acts as an elastic hinge, thus creating the advantage that rattling of the bearing arms 7 on the gutter 14 in the area of the hinged joint is effectively prevented.

Furthermore, a compression spring member is fitted underneath each bearing arm 7. This compression spring member consists of a compression spring 20 which is wound about a telescopic pin-and-sleeve assembly 18 and is confined between spring retainers 19. The lower part of the pin-and-sleeve assembly 18 is pivotally connected to a support 21 provided on the front part of the bearing plate 15. The upper part of the pin-and-sleeve assembly 18 is pivotally connected to the relative bearing arm 7 near the front end thereof.

Figure 2:
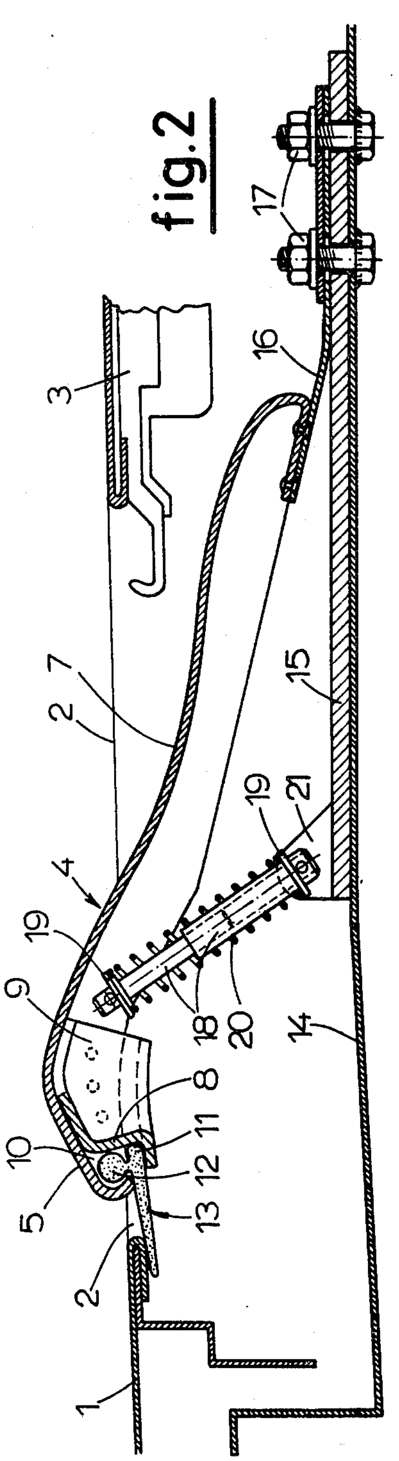
FIG. 2 is a vertical longitudinal section along the plane II—II in FIG. 1 on a larger scale.

In FIG. 2, the air-guiding strip 4 is shown in its highest or operative position, where the elastic sealing section 13 contacts the roof opening 2 underneath the front edge thereof. In this position, the telescopic pin-and-sleeve assemblies 18 have their greatest length, so that the compression springs 20 then possess their maximum extension. However, the two compression springs 20, having at the same time assumed a steeply inclined upward position, are capable of applying a powerful upward force to the air-guiding strip 4. Any vibration of the air-guiding strip 4 under the action of the wind force is thus effectively prevented.

Figure 3:
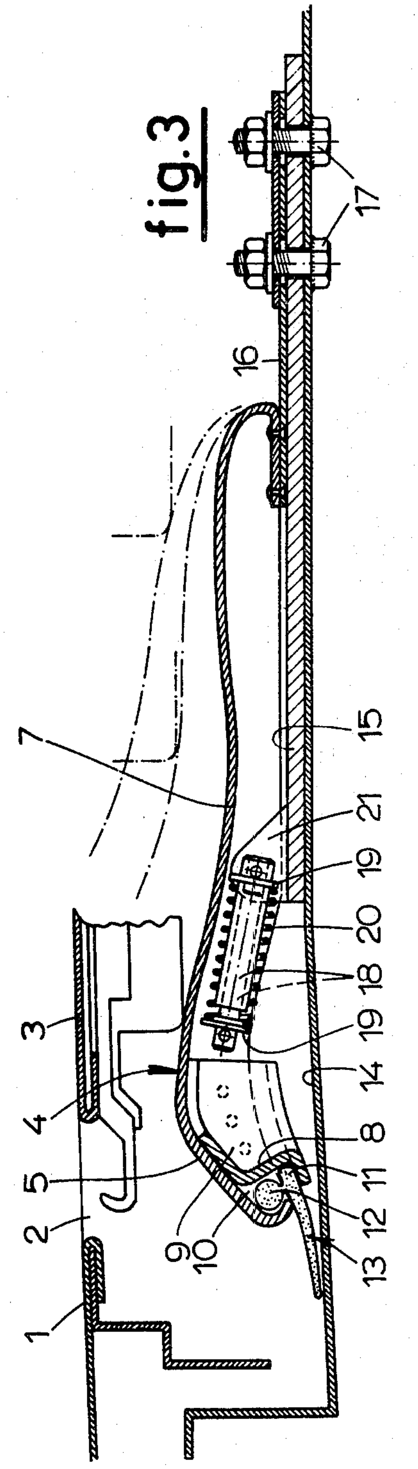
FIG. 3 is a section corresponding to FIG. 2, but with the panel almost in the closed position.

In FIG. 3, the panel 3 is pushed forward and has almost reached the closed position. The bearing arms 7 have been swung down by the panel 3, resulting in a very substantial reduction of the slope of the compression springs 20 as compared to their position according to FIG. 2. The upward component of the force applied by the compression springs 20 to the bearing arms 7 will thus be substantially smaller in the inoperative position according to FIG. 3 than in the operative position according to FIG. 2.

The bearing arms 7 of the air-guiding strip 4 are engaged by the panel 3 during the closing movement of the panel 3 and bring about, during the continued closing movement of the panel 3, the downward movement of the air-guiding strip 4. As shown in FIGS. 2 and 3, the bearing arms 7 possess on their upper side a well-defined wavy shape. This allows the course of the forces to be applied by the panel 3 to the bearing arms 7 during the closing movement to be largely controlled.

In the operative position, the bearing arms 7 furthermore have an air-guiding effect, with the result that lateral air ingress into the vehicle is counteracted.

The invention is not restricted to the examples shown in the drawing, which can be varied in several manners within the scope of the invention.

It is possible, for example, that at least the front part of the air-guiding strip 4 consists of a tubular sleeve, on which sleeve retaining lips can be formed for the elastic sealing section 13.

I claim:

1. An open-roof construction for a vehicle, comprising an air-guiding strip fitted on the front side of a roof opening of the vehicle and supported on both sides by spring members carried by the vehicle, said strip and said spring members being accommodated underneath a sliding panel of the vehicle in the closed position thereof, while said strip is displaced upwards into an operative position by said spring members when said panel is being opened, and is moved downwards again into a rest position against the pressure of said spring members under the action of said panel when the latter is being closed, wherein said strip connects on the both sides to a rearward, rigid bearing arm pivotally supported by the vehicle and with which said panel engages when it is being closed, while one of said spring members is provided underneath each bearing arm, the underside of said one spring member being pivotally connected to the vehicle, the upper side being pivotally connected to said bearing arm, said spring members pivoting upwards to assume a more vertical position when said strip is displaced upwards into the operative position, and pivoting downwards to assume a less vertical position when said strip is displaced downwards, so that the vertical upward force component of said spring members substantially has a maximum value in the operative position of said strip, and a minimum value in the rest position thereof; wherein each bearing arm is supported by the vehicle with the use of a leaf spring; wherein said strip is supported by a gutter on the both sides; and wherein said gutter is equipped on the both sides with a horizontal bearing plate, the front part of which is provided with a support for one of said spring members, which is hinged thereon, while one of said leaf springs is secured on the rear end of said bearing plate.

2. The open-roof construction as defined in claim 1, wherein said spring members consist of compression springs acting upon a telescopic pin-and-sleeve assembly and being confined between spring supports, an upper part of said assembly being hinged to said bearing arm.

3. The open-roof construction as defined in claim 1, wherein said spring members include telescopic spring means.

4. The open-roof construction as defined in claim 3, wherein said spring members consist of compression springs arranged in cooperation with a telescopic pin-and-sleeve assembly and being confined between spring supports, a lower part of said assembly being hinged to the vehicle, and an upper part thereof to said bearing arm.

5. An air-guiding strip for an open-roof construction for a vehicle, comprising a front part connected on both sides through a bent to a rearward, rigid bearing arm; an elastic sealing section which contacts in an operative position a roof opening of the vehicle underneath an edge thereof, the back surface of at least the front part of the strip bearing an S-shaped stiffening strip, which forms a holder for said sealing section together with the air-guiding strip.

6. The air-guiding strip as defined in claim 5, wherein said bearing arms have the shape of an inverted U in vertical section.

7. The air-guiding strip as defined in claim 5, wherein said stiffening strip has at least one curved end fastened to said bend.

8. The air-guiding strip as defined in claim 5, wherein at least said front part consists of a tubular sleeve.

* * * * *